UNITED STATES PATENT OFFICE 2,448,958

DIKETO ACRYLATES

Albert M. Clifford, Stow, Ohio, assignor to Wingfoot Corporation, Akron, Ohio, a corporation of Delaware No Drawing. Application December 8, 1945, Serial No. 633,879

3 Claims. (Cl. 260—486)

This invention relates to diketo acrylates and particularly to the acrylic acid esters of an alcohol, the ester-forming residue of which is connected to the acid through a terminal secondary carbon atom having two carbonyl groups attached thereto.

Many acrylates are known, particularly those containing a relatively inert alcohol residue. For certain uses it is desirable to employ an acrylate in which the alcohol residue contains two active as well as activating groups, i. e., carbonyl groups, in the beta-position to the acid carbonyl group. Compounds having this unique grouping of carbonyl radicals are generally rather difficult to synthesize. However, a method has now been discovered by which acrylates may be made having this desirable arrangement of carbonyl groups.

The acrylates of this invention may be prepared by the reaction of an alkali metal salt of acrylic acid or of a substituted acrylic acid with a diketone containing a halogenated secondary carbon atom having attached thereto two carbonyl groups. Generally, the reaction will take place by heating the acrylic acid salt with a halogenated diketone at reflux temperature in the presence of a polymerization inhibitor, as, for example, hydroquinone.

The substituted acrylic acids include alpha methyl, alpha ethyl and alpha chloroacrylic acid and may be represented by the general formula $CH_2:C(R)CO_2H$ in which R is chloro, methyl and ethyl. The substituent is not critical, however, and therefore the term "substituted acrylic acids" includes any of the known members of this group.

The preferred salt of acrylic acid, including substituted acrylic acid, is that of sodium. Other salts may be used, as, for example, the acrylic acid salt of potassium, etc. The salts are generally formed by means of the hydrolysis of an organic acrylate. For example, the sodium salt of methacrylic acid is prepared by reacting a solution of 88 parts of sodium hydroxide in 800 parts of water with 200 parts of methyl methacrylate containing two parts of hydroquinone, with stirring, for about 40 minutes in a reactor equipped with means for removing the generated methyl alcohol.

Any of the diketones having two carbonyl groups connected to a halogenated secondary carbon atom may be used. One class of these diketones may be referred to as the diacyl halomethanes having the general formula $$XCH(C:OR)_2$$

in which X is a halogen including chlorine-, bromine-, and iodine- and R is any organic hydrocarbon radical. Another class of these halogenated diketones is the cyclic diacyl halo methanes having the general formula

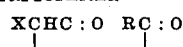

in which X is a halogen, as above, and R is any divalent hydrocarbon radical having three carbon atoms in a chain. Specific halogenated diketones of this type are dibenzoyl chloromethane, dibenzoyl bromomethane, benzoyl acetyl chloromethane, diacetyl chloromethane, acetyl butyryl chloromethane, 2-bromo-5-phenyl-1,3-cyclohexadione, 2-bromo-5-alkyl-1,3-cyclohexadione where alkyl may be methyl, ethyl, propyl, butyl, etc.; 2-bromo-4,5-trialkyl-1,3-cyclohexadione in which the three alkyls may be methyl, ethyl, propyl, butyl, pentyl, etc.; 2-bromo-1,3-cyclohexadione, etc.

The following examples illustrate specific embodiments of the invention and are intended to be illustrative only, and are not intended to limit the scope of the invention. The term "parts" whenever used signifies "parts by weight."

EXAMPLE 1

(Diacetyl methyl) methacrylate

A mixture of 33 parts of sodium methacrylate and 53 parts of diacetyl chloromethane together with two parts of water and three parts of hydroquinone was heated four hours at 80–95° C. with constant stirring. The reaction mass was filtered while still hot (80° C.) to remove the salts present. Another quantity of 2 parts of hydroquinone was added to the filtered reaction mixture, which was a viscous brown liquid, and then distilled at reduced pressure 34 mm. to give a clear, yellow liquid boiling in the range of 73–75° C. at 34 mm. having the formula $$CH_2:C(CH_3)CO_2CH(C:OCH_3)_2$$

EXAMPLE 2

4,5-trimethyl-1,2-hexadionyl methacrylate

A mixture of one mol of sodium methacrylate and one mol of 2-bromo-4,5,5-trimethyl-1,2-hexadione, together with 2 parts of water and 3 parts of hydroquinone was heated 4 hours at reflux temperature during constant stirring and the resulting reaction mass was filtered while hot (85° C.) to remove the salts present. The resulting filtrate was distilled to recover the 4,5-trimethyl-1,2-hexadionyl acrylate.

The diketo acrylates of this invention are easily polymerized to a solid mass. They also may be copolymerized with other polymerizable unsaturated compounds, as, for example, styrene, pinene, camphene, monovinyl acetylene, and divinyl acetylene, vinyl ethinyl, alkyl carbinols, vinyl acetate, vinyl chloride, other acrylates such as butyl acrylate, methyl methacrylate, methyl chloracrylate, furyl acrylate, acrylic amide, acrylic nitrile, etc. This copolymerization may be carried out at any temperature from about 25° C. to about 100° C. or above. It has been found, however, that temperatures in the range between about 50–70° C. are in general the most suitable. At lower temperatures the polymerization is usually too slow, while at higher temperatures more elaborate equipment is required to withstand the high pressure.

The polymerization may be accelerated by the usual polymerizable catalysts, such as hydrogen peroxide, benzoyl peroxide, ammonium persulfate and sodium perborate, as well as by increasing the temperature, pressure or concentration of emulsifying agent, or by adjusting the hydrogen ion concentration, or by the choice of emulsifying agent.

Suitable changes may be made in the details of the process without departing from the spirit or scope of the present invention, the proper limits of which are defined in the appended claims.

This application is a continuation-in-part of my copending application Serial No. 443,644, filed May 19, 1942, now abandoned.

I claim:
1. The acrylic acid and substituted acrylic acid esters having the general formula

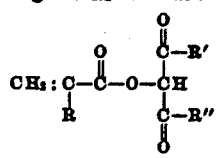

where R is selected from the group consisting of hydrogen, chlorine, and methyl and ethyl radicals and R' and R'' are selected from the group consisting of alkyl and aryl radicals.
2. Diacetylmethyl acrylate.
3. Diacetylmethyl methacrylate.

ALBERT M. CLIFFORD.

REFERENCES CITED

The following references are of record in the file of this patent:

UNITED STATES PATENTS

| Number | Name | Date |
|---|---|---|
| 2,129,664 | Barrett et al. | Sept. 13, 1938 |
| 2,198,172 | McGill | Apr. 23, 1940 |
| 2,296,823 | Pollack et al. | Sept. 22, 1942 |

OTHER REFERENCES

Combes, "Comptes Rendus," vol. III (1890) pp. 421–423.